US012596603B2

(12) United States Patent
Sridharan et al.

(10) Patent No.: US 12,596,603 B2
(45) Date of Patent: Apr. 7, 2026

(54) DEFECT TRACKING WITHIN A COMPUTING ENVIRONMENT

(71) Applicant: Advanced Micro Devices, Inc., Santa Clara, CA (US)

(72) Inventors: Vilas Sridharan, Boston, MA (US); Jeffrey William Kellington, Austin, TX (US); Naveen Krishna Chatradhi, Bangalore (IN); Sivakumar Sathappan, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/678,648

(22) Filed: May 30, 2024

(65) Prior Publication Data

US 2025/0370842 A1 Dec. 4, 2025

(51) Int. Cl.
*G06F 11/07* (2006.01)
*G06F 11/14* (2006.01)
(52) U.S. Cl.
CPC ........ *G06F 11/0787* (2013.01); *G06F 11/073* (2013.01); *G06F 11/0793* (2013.01); *G06F 11/1417* (2013.01)

(58) Field of Classification Search
CPC .............. G06F 11/073; G06F 11/0775; G06F 11/0787; G06F 11/079; G06F 11/0793; G06F 11/1417
See application file for complete search history.

(56) References Cited

U.S. PATENT DOCUMENTS

| | | | | |
|---|---|---|---|---|
| 7,783,919 B2 * | 8/2010 | Khatri | ................... | G06F 11/073 |
| | | | | 714/6.13 |
| 9,507,675 B2 * | 11/2016 | Chun | ..................... | G11C 29/00 |
| 10,725,853 B2 * | 7/2020 | Zhang | ................. | G06F 11/1666 |
| 11,379,330 B2 * | 7/2022 | Chaiken | .............. | G06F 11/3037 |
| 11,573,905 B2 * | 2/2023 | Stumpf | ............... | G06F 11/1441 |

* cited by examiner

*Primary Examiner* — Joseph R Kudirka
(74) *Attorney, Agent, or Firm* — Kevin T. Cuenot

(57) ABSTRACT

Defect tracking within a computing environment includes storing a retired page table within a read only memory (ROM) of a computing node. A hardware processor of the computing node detects one or more System-on-Chips (SoCs) within the computing node. The hardware processor reads the retired page table from the read only memory. The hardware processor compares records of the retired page table with the one or more SoCs within the computing node. For each record of the retired page table that matches the one or more SoCs within the computing node, one or more physical pages of a volatile memory of the one or more SoCs are retired based on each record.

20 Claims, 8 Drawing Sheets

300

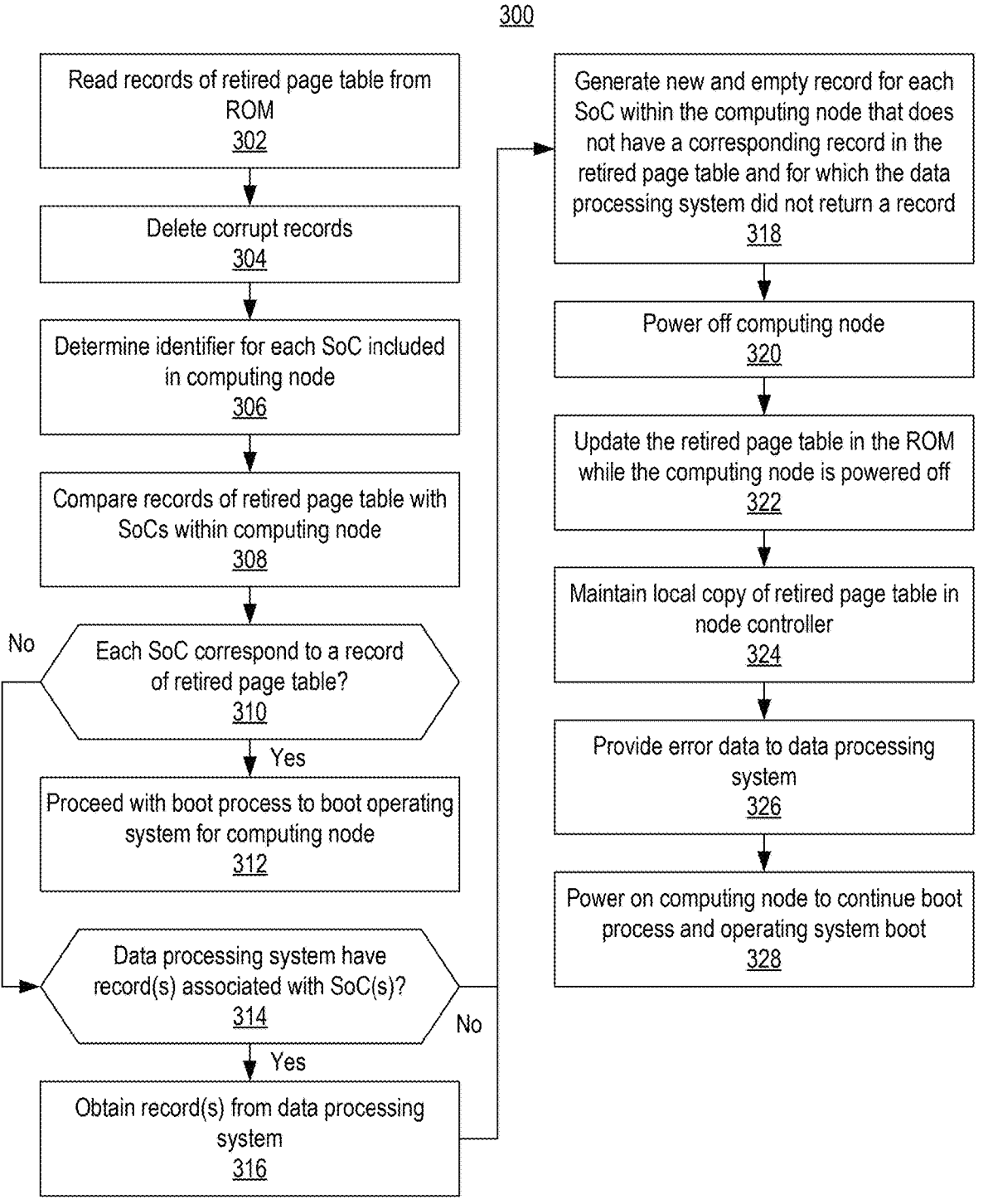

Read records of retired page table from ROM
302

Delete corrupt records
304

Determine identifier for each SoC included in computing node
306

Compare records of retired page table with SoCs within computing node
308

Each SoC correspond to a record of retired page table?
310

No

Yes

Proceed with boot process to boot operating system for computing node
312

Data processing system have record(s) associated with SoC(s)?
314

No

Yes

Obtain record(s) from data processing system
316

Generate new and empty record for each SoC within the computing node that does not have a corresponding record in the retired page table and for which the data processing system did not return a record
318

Power off computing node
320

Update the retired page table in the ROM while the computing node is powered off
322

Maintain local copy of retired page table in node controller
324

Provide error data to data processing system
326

Power on computing node to continue boot process and operating system boot
328

Read records of retired page table from ROM
402

Delete corrupt records from retired page table
404

Determine DRAM addresses from records
406

Determine SPAs for physical pages of HBM based on DRAM addresses
408

Retire each physical page
410

Write error data from retired page table to user space
412

Complete boot process and enter runtime mode
414

500

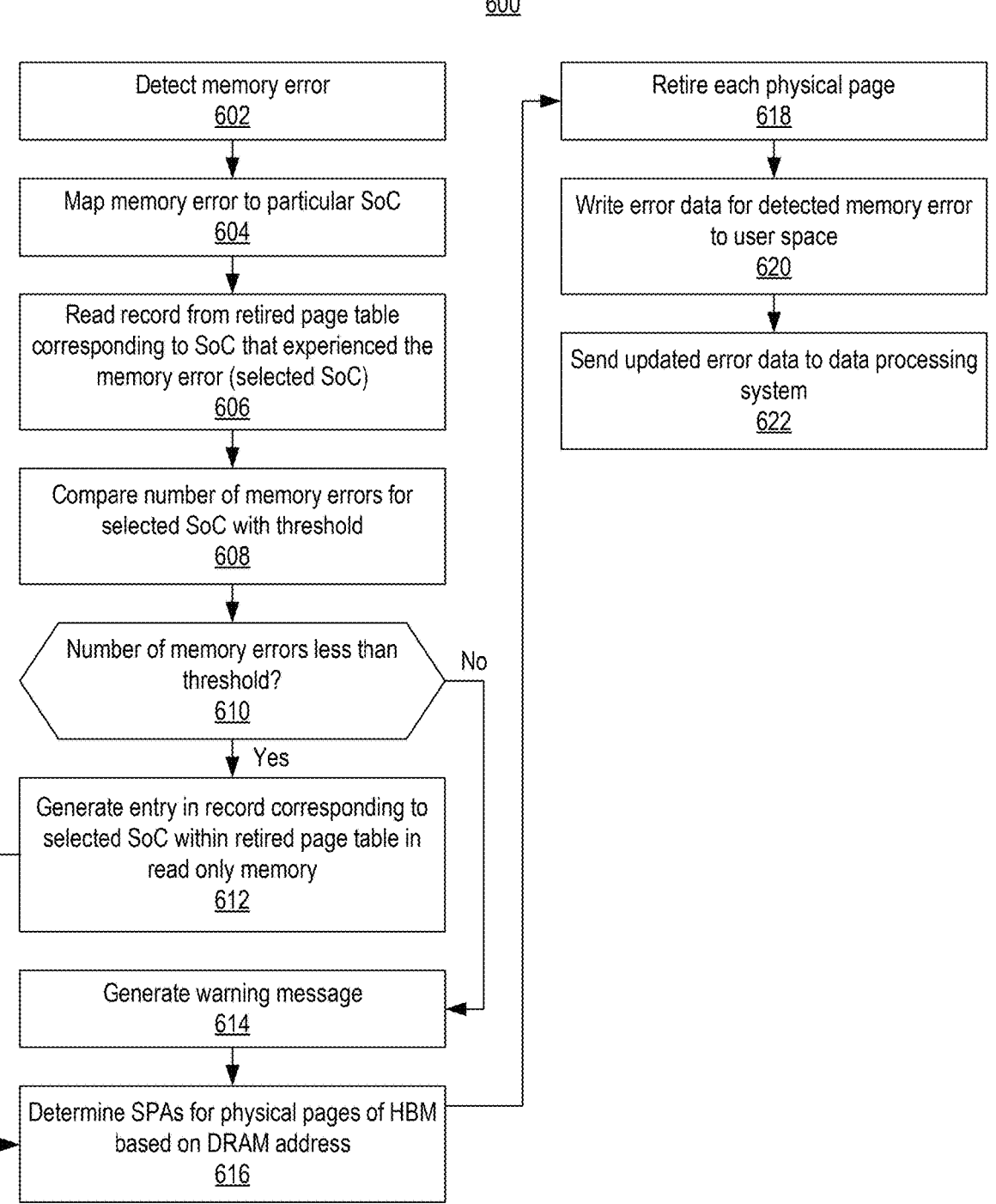

600

Detect memory error
602

Map memory error to particular SoC
604

Read record from retired page table corresponding to SoC that experienced the memory error (selected SoC)
606

Compare number of memory errors for selected SoC with threshold
608

Number of memory errors less than threshold?
610

No

Yes

Generate entry in record corresponding to selected SoC within retired page table in read only memory
612

Generate warning message
614

Determine SPAs for physical pages of HBM based on DRAM address
616

Retire each physical page
618

Write error data for detected memory error to user space
620

Send updated error data to data processing system
622

DEFECT TRACKING WITHIN A COMPUTING ENVIRONMENT

TECHNICAL FIELD

This disclosure relates to defect tracking within a computing environment.

BACKGROUND

In some computer systems, the operating system is capable of retiring portions of physical memory in which memory errors are detected. In response to a detected error, the operating system declares that portion of physical memory as being "retired." Once declared retired by the operating system, the portion of physical memory of the computer system is unavailable for use by application(s) and/or process(es) executed by the operating system.

In some conventional computer systems, the retired portions of physical memory are not persisted from one boot cycle to another. Once the computer system is rebooted, any error data specifying retired portions of physical memory is lost or deleted. The error data is unavailable for any purpose. This means, after a reboot of the computer system, the faulty portions of physical memory remain in continued use at least until the memory errors occur again. In consequence, the computer system may experience further faults and/or compromised performance.

SUMMARY

In one or more embodiments, a method includes storing a retired page table within a read only memory of a computing node. The method includes detecting, by a hardware processor of the computing node, one or more System-on-Chips (SoCs) within the computing node. The method includes reading, by the hardware processor, the retired page table from the read only memory. The method includes comparing, by the hardware processor, records of the retired page table with the one or more SoCs within the computing node. The method includes, for each record of the retired page table that matches the one or more SoCs within the computing node, retiring one or more physical pages of a volatile memory of the one or more SoCs based on each record.

The foregoing and other implementations can each optionally include one or more of the following features, alone or in combination. Some example implementations include all the following features in combination.

In some aspects, the method includes storing the retired page table within a read only memory of a computing node. In one or more other aspects, an updated version of the retired page table may be stored in and/or written to the read only memory. In still one or more other aspects, one or more records (e.g., updated and/or new records) may be stored in and/or written to the retired page table in the read only memory.

In some aspects, the method includes publishing one or more records of the retired page table of the read only memory to a user space of an operating system of the computing node.

In some aspects, the method includes, in response to detecting a selected SoC of the one or more SoCs within the computing node that does not match any record of the retired page table, creating a new and empty record for the selected SoC.

In some aspects, the method includes, in response to detecting a selected SoC of the one or more SoCs within the computing node that does not match any record of the retired page table, querying a data processing system for a record corresponding to the selected SoC.

In some aspects, the method includes maintaining, by the hardware processor, a local copy of the retired page table, generating an updated retired page table by modifying at least one entry of the local copy of the retired page table, and writing the updated retired page table to the read only memory of the computing node.

In some aspects, the hardware processor is a node controller of the computing node.

In some aspects, the one or more SoCs include a plurality of SoCs and the hardware processor is an SoC of the plurality of SoCs.

In some aspects, the hardware processor is configured to convey error data from the retired page table to a data processing system.

In some aspects, during runtime, the method includes, in response to detecting a memory error for a selected SoC of the one or more SoCs within the computing node, comparing a number of entries in the record of the retired page table for the selected SoC with a threshold number of entries that is less than a physical entry limit. During runtime, the method also includes, in response to the number of the entries exceeding the threshold number of entries and being less than the physical entry limit, retiring one or more additional physical pages of a volatile memory of the selected SoC that correspond to the memory error without generating a further entry for the memory error in the record of the retired page table for the selected SoC.

In some aspects, during runtime, the method includes, in response to detecting a memory error for a selected SoC of the one or more SoCs within the computing node, comparing a number of entries in the record of the retired page table for the selected SoC with a threshold number of entries. During runtime, the method also includes, in response to the number of the entries being less than the threshold number of entries, retiring one or more additional physical pages of a volatile memory of the selected SoC that correspond to the memory error and generating an entry for the memory error in the record of the retired page table for the selected SoC.

In one or more embodiments, a computing node includes a read only memory configured to store a retired page table. The computing node includes one or more System-on-Chips (SoCs). The computing node includes a hardware processor configured to execute operations. The operations include detecting the one or more SoCs within the computing node. The operations include reading the retired page table from the read only memory. The operations include comparing records of the retired page table with the one or more SoCs within the computing node. The operations include, for each record of the retired page table that matches the one or more SoCs within the computing node, retiring one or more physical pages of a volatile memory of the one or more SoCs based on each record.

The foregoing and other implementations can each optionally include one or more of the following features, alone or in combination. Some example implementations include all the following features in combination.

In some aspects, the hardware processor is configured to execute operations including publishing one or more records of the retired page table of the read only memory to a user space of an operating system of the computing node.

In some aspects, the hardware processor is configured to execute operations including, in response to detecting a selected SoC of the one or more SoCs within the computing node that does not match any record of the retired page table, creating a new and empty record for the selected SoC.

In some aspects, the hardware processor is configured to execute operations including, in response to detecting a selected SoC of the one or more SoCs within the computing node that does not match any record of the retired page table, querying a data processing system for a record corresponding to the selected SoC.

In some aspects, the computing node includes a node controller. The node controller is configured to execute operations including maintaining a local copy of the retired page table, generating an updated retired page table by modifying at least one entry of the local copy of the retired page table, and writing the updated retired page table to the read only memory of the computing node.

In some aspects, the hardware processor is a node controller of the computing node.

In some aspects, the one or more SoCs include a plurality of SoCs and the hardware processor is an SoC of the plurality of SoCs.

In some aspects, the hardware processor is configured to execute operations including providing error data from the retired page table to a data processing system.

In some aspects, during runtime, the hardware processor is configured to execute operations including, in response to detecting a memory error for a selected SoC of the one or more SoCs, comparing a number of entries in the record of the retired page table for the selected SoC with a threshold number of entries that is less than a physical entry limit. During runtime, the hardware processor also is configured to execute operations including, in response to the number of the entries exceeding the threshold number of entries and being less than the physical entry limit, retiring one or more additional physical pages of a volatile memory of the selected SoC that correspond to the memory error without generating a further entry for the memory error in the record of the retired page table for the selected SoC.

In some aspects, during runtime, the hardware processor is configured to execute operations including, in response to detecting a memory error for a selected SoC of the one or more SoCs, comparing a number of entries in the record of the retired page table for the selected SoC with a threshold number of entries. During runtime, the hardware processor also is configured to execute operations including, in response to the number of the entries being less than the threshold number of entries, retiring one or more additional physical pages of a volatile memory of the selected SoC that correspond to the memory error and generating an entry for the memory error in the record of the retired page table for the selected SoC.

In one or more example implementations, a computer program product includes one or more computer readable storage mediums having program instructions embodied therewith. The program instructions are executable by computer hardware, e.g., a hardware processor such as an SoC of a computing node and/or a node controller of the computing node, to cause the computer hardware to initiate and/or execute operations as described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 illustrates a method of booting a computing node in accordance with one or more embodiments of the disclosed technology.

FIG. 6 illustrates a method of logging and persisting memory errors detected during runtime of a computing node in accordance with one or more embodiments of the disclosed technology.

DETAILED DESCRIPTION

Figure 1:
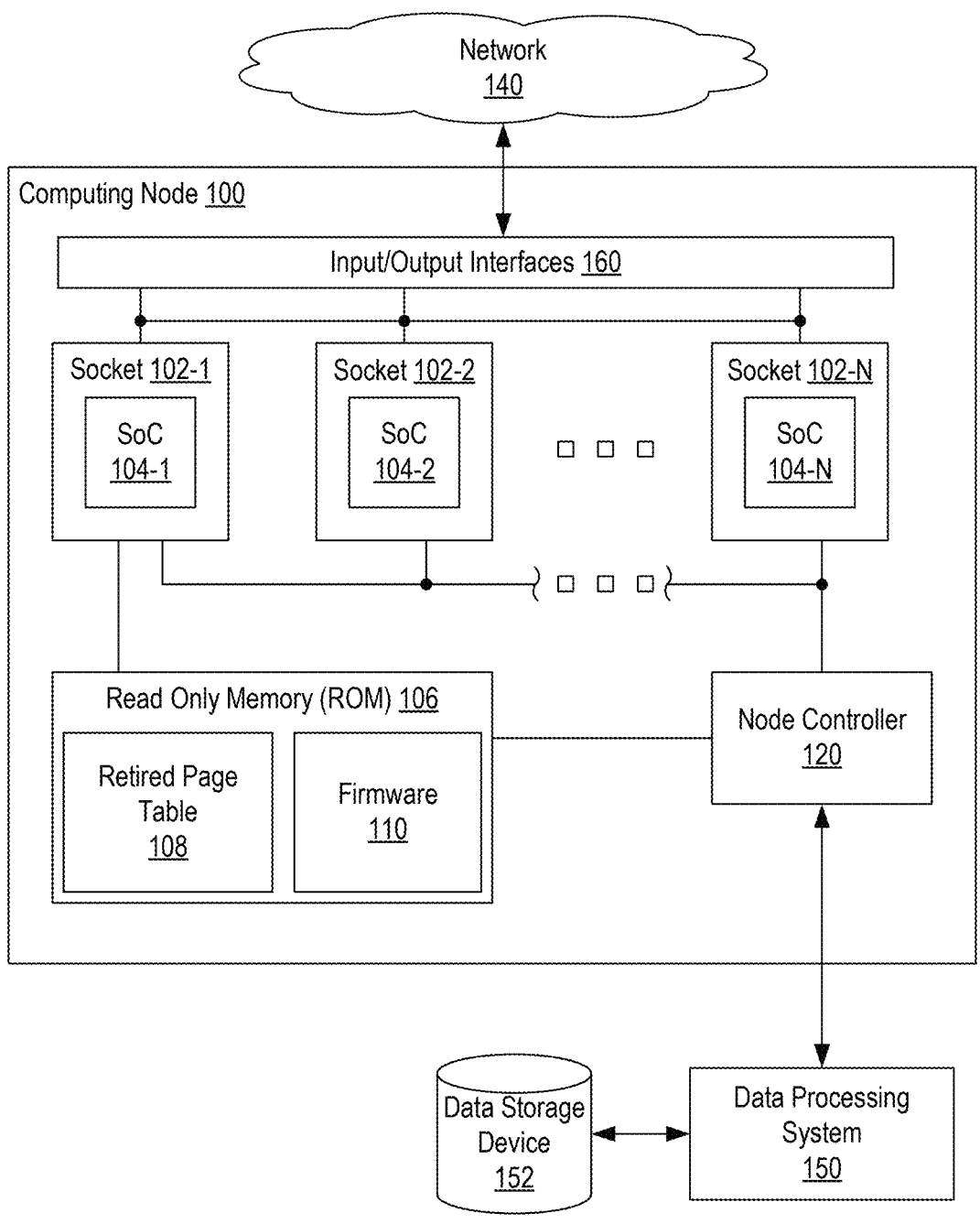
FIG. 1 illustrates a computing node in accordance with one or more embodiments of the disclosed technology.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to defect tracking within a computing environment. In accordance with the inventive arrangements described within this disclosure, certain systems within a computing environment are adapted to cooperate with one another to persist error data pertaining to memory errors of a computing node over a reboot (e.g., over one or more boot cycles).

Within a computing environment such as a data center, the servers, e.g., computing nodes, may include one or more sockets. Each socket may be configured to receive a System-on-Chip (SoC) therein. In some cases, the computing node and/or SoCs therein include on-chip volatile memory. The computing node and/or SoCs therein may lack non-volatile memory capable of persisting error data from one boot cycle to the next. Inclusion of non-volatile memory in each SoC is also costly in terms of power and area. Thus, any error data specifying memory errors that may be generated during runtime of the computing node and/or SoCs therein is lost when the computing node is powered off and/or rebooted. If after a reboot, for example, an SoC is moved to a different socket, whether in the same computing node or in a different computing node, the error data for that SoC is unavailable and unable to travel with the SoC. Reconstructing the error data and retiring the faulty physical memory of the SoC means that the SoC must experience the memory errors again at runtime, which may degrade performance of the computing node.

The inventive arrangements provide mechanisms that persist memory errors as error data within a computing node. By persisting the error data, the error data remains available for use despite the computing node being power cycled (e.g., restarted, powered off and then on, and/or rebooted). In accordance with the inventive arrangements, in response to detecting certain memory errors in a computing node, the portions of physical memory that experienced the memory error(s) may be retired by the operating system of the computing node. Error data specifying the memory error(s) and/or any affected portions of physical memory may be persisted from one boot cycle to another of the computing node. The error data may be persisted using one or more different mechanisms described hereinbelow within this disclosure.

The inventive arrangements also provide a solution for persisting error data in cases where the memory errors occur in a Field Replaceable Unit (FRU). In an FRU that lacks the capability and/or non-volatile memory needed to persist error data across boot cycles, loss of error data may be even more problematic than with a computer system in general. Within a large computing environment such as a data center, the FRU having faulty portions of physical memory may remain in service because the error data is unavailable when the proper response may be to decommission the FRU. In other cases, without the benefit of the error data, the FRU may even be moved to a different computing system and remain in service only to have the memory errors arise again in a different application or context.

In one or more embodiments, for a given computing node, the operating system, firmware, and data center infrastructure firmware are able to cooperate to persist error data specifying retired physical pages of volatile memory of the computing node. The error data may be persisted over one or more boot cycles. Further, the error data and optionally FRU movements such as socket swaps and/or computing node swaps may be made available or published to other data processing systems within the computing environment. Thus, computing nodes may obtain or request error data for FRUs that are detected therein in consequence of a socket swap and/or a computing node swap.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates a computing node 100 in accordance with one or more embodiments of the disclosed technology. Computing node 100 is an example of a computing system that may be located within a computing environment. In the example of FIG. 1, computing node 100 may be one of a plurality (e.g., many) of computing nodes and/or data processing systems existing within a computing environment. The various computing nodes and/or data processing systems of the computing environment may be interconnected or coupled. As an illustrative and non-limiting example, the computing environment may be a data center.

In the example, computing node 100 is coupled to a network 140. Computing node 100 is also coupled to a data processing system 150. In one or more embodiments, data processing system 150 is implemented as an administrative node or console within the computing environment. In the example, data processing system 150 is coupled to a data storage device 152. Though illustrated as being separate or independent of data processing system 150, in one or more embodiments, data storage device 152 may be incorporated within or as part of data processing system 150. Data processing system 150 may be coupled to computing node 100 via a different communication link than network 140. For example, while communication links established through network 140 may be considered "in-band" and available for various applications, the communication link between computing node 100 and data processing system 150 may be an "out-of-band" communication link that may be reserved for administrative functions.

Referring to FIG. 1, computing node 100 includes one or more sockets illustrated as socket 102-1, socket 102-2, through socket 102-N. Each socket 102 is configured to receive an SoC 104 illustrated in FIG. 1 as SoC 104-1, SoC 104-2, through SoC 104-N. In the example of FIG. 1, the value of N may be 1, 2, 3, 4, or more. The particular number of sockets 102 and/or SoCs 104 included in computing node 100 is not intended as a limitation of the inventive arrangements. In one or more embodiments, each SoC 104 may be an implementation of a server within a single package. In one or more embodiments, computing node 100 may include fewer SoCs 104 than sockets 102.

In the example of FIG. 1, socket 102-1, and as such SoC 104-1, is coupled to a read-only memory (ROM) 106. In one or more alternative embodiments, two or more or each socket 102-1 (and as such the corresponding SoC 104) may be coupled to ROM 106. In the example, each socket 102, and as such each SoC 104, is coupled to a node controller 120.

In one or more embodiments, sockets 102 may be disposed on a same circuit board with ROM 106 and node controller 120. For example, computing node 100 may be implemented as a blade type of computing node. In one or more other embodiments, sockets 102 may be disposed on a plurality of interconnected circuit boards. ROM 106 may be disposed on the same circuit board as one or more or all of sockets 102 or on a different circuit board that is coupled to other circuit boards including sockets 102. Similarly, node controller 120 may be disposed on the same circuit board as one or more or all of sockets 102 or on a different circuit board coupled to sockets 102.

In one or more embodiments, ROM 106 is implemented as a serial peripheral interface (SPI) ROM. In the example of FIG. 1, ROM 106 is configured to store a retired page table 108. In one or more aspects, retired page table 108 is implemented using Error Record Serialization Table (ERST) functionality. ERST functionality is defined by the Advanced Configuration and Power Interface (ACPI) specification as an ACPI Platform Error Interface (APEI). ERST functionality provides a mechanism for storing hardware error information to a persistent memory such as ROM 106 and retrieving the hardware error information from the persistent memory. In one or more embodiments, retired page table 108 is capable of storing one or more records configured to store or document memory errors detected in SoCs 104 of computing node 100.

ROM 106 also stores firmware 110 for computing node 100. In one or more embodiments, firmware 110 is implemented as a Basic Input Output System (BIOS). In one or more other embodiments, firmware 110 is implemented as a Unified Extensible Firmware Interface (UEFI). In the latter case, a UEFI volume may be used to fix retired page table 108 to a particular or predetermined location therein that is accessible by one or more processors as described herein-below in greater detail.

In the example of FIG. 1, a particular one of SoCs 104 is designated as the boot processor. For purposes of discussion, the designated SoC 104 may be SoC 104-1. As an illustrative and non-limiting example, SoC 104-1 may be implemented as or include a hardware processor that is tasked with booting the operating system of computing node 100. Once booted, SoC 104-1 is capable of passing any necessary information to the other ones of the SoCs 104 in computing node 100 for runtime operation, which is also referred to herein as the "mission mode."

In the example of FIG. 1, firmware 110 is capable of reserving a predetermined amount of space in ROM 106 for retired page table 108. In one or more embodiments, firmware 110 reserves 64 KB within ROM 106. It should be appreciated that the particular amounts of memory and particular sizes of data structures described within this disclosure are for purposes of illustration and are not intended to limit the inventive arrangements.

As illustrated, node controller 120 may be coupled to one or more other data processing systems by way of the out-of-band communication channel. In one or more embodiments, node controller 120 is implemented as a Baseboard Management Controller (BMC). In one or more embodiments, node controller 120 is implemented as a hardware processor. In this regard, the communication channel linking node controller 120 and SoCs 104 may be separate and independent of other communication channels within computing node 100. For example, the communication channel over which node controller 120 communicates with SoCs 104 may be separate and independent of one or more other communication channels that couple sockets 102 for communication among SoCs 104.

By way of node controller 120, a system administrator operating an administrative console, e.g., data processing system 150, may provide commands directly to computing node 100 for purposes of booting, rebooting, or sending other commands to computing node 100. For purposes of discussion, commands received by computing node 100 via node controller 120 may be referred to herein as "adminis-trative commands." As an example, from an administrative console in communication with node controller 120, certain functions of firmware 110 may be accessed.

In the example, computing node 100 may be coupled to any of a variety of other systems and/or devices by way of input/output (I/O) interfaces 160 and/or network 140. That is, computing node 100 may include one or more I/O interfaces to facilitate coupling of computing node 100 to one or more other systems whether by way of direct (e.g., point-to-point) connections and/or network connections. Such connections may be wired and/or wireless. As noted, data conveyed over I/O interfaces 160 may be considered in-band communication links, which are generally utilized by applications executed in mission mode and which are to be differentiated from the out-of-band communication link(s) supported by node controller 120.

For purposes of discussion, each SoC 104 illustrated in computing node 100 may be considered an FRU. That is, SoCs 104 may be removed from respective sockets 102, moved to other sockets 102 of computing node 100, and/or moved to sockets in other like computing nodes within the computing environment. Retired page table 108 is configured to store error data for SoCs 104 existing within com-puting node 100. Accordingly, as described hereinbelow in greater detail, the error data, as embodied in retired page table 108 in ROM 106, may be persisted and/or shared via one or more mechanisms described herein.

In one aspect, the error data of retired page table 108 is persisted in ROM 106 from one boot and/or power cycle to the next. Retired page table 108 may be read from ROM 106 during subsequent boots of computing node 100. This allows the operating system of computing node 100 to learn of any physical pages of volatile memory that may have been retired in previous runtime operation. This allows the SoC 104 and/or computing node 100 to better self-manage opera-tion by avoiding use of retired page frames after a reboot or power cycle.

In still another aspect, the error data may be conveyed to one or more other data processing systems within the computing environment. The error data, as persisted in retired page table 108, may be accessed by node controller 120 and made available to data processing system 150 and/or stored in data storage device 152.

In another aspect, the error data may be exposed to the user space of the operating system of computing node 100. In this manner, the error data may be utilized by one or more applications and/or processes executing on computing node 100. For example, the error data may be used by the one or more applications and/or processes during mission mode.

These different mechanisms allow the error data to "travel" with the particular SoC 104 that experienced the memory error(s) within the computing environment. Error data, for example, may be retrieved from data storage device 152, for example, for particular SoCs 104 in the event such SoCs 104 are moved to different sockets 102 and/or different computing nodes altogether.

During runtime operation of computing node 100, e.g., post boot of the operating system, the operating system is capable of invoking functions of firmware 110 to store certain hardware errors in retired page table 108. Hardware errors may be stored on a per FRU (e.g., a per SoC 104) basis. An example of a hardware error is a machine check exception (MCE) error, which is generated by an SoC 104 in response to detecting a hardware error or failure. The operating system may invoke functions of firmware 110 to store the hardware error in ROM 106 and, more particularly, within a record of retired page table 108. In one or more embodiments, each memory error, e.g., each MCE, may be stored as an entry of a record of retired page table 108 using the Common Platform Error Record (CPER) format.

In one or more embodiments, retired page table 108 includes a plurality of sections. For example, retired page table 108 includes N different sections, where N is equal to the number of sockets 102 in computing node 100. In an example where retired page table 108 is constrained to 64 KB, each SoC 104 or FRU has 64 KB/N storage space, e.g., a section, for storing a record specifying hardware errors specific to the particular FRU.

In general, node controller 120 is capable of updating data and/or firmware 110 within ROM 106. It should be appre-ciated that in cases where node controller 120 updates ROM 106, node controller 120 may preserve retired page table 108 therein. That is, node controller 120 does not overwrite retired page table 108 except to store an updated version of retired page table 108 (also referred to as an "updated retired page table") therein and/or to update or modify particular records of retired page table 108.

Using the inventive arrangements described herein, the operating system used by computing node 100 may be configured to use ERST as a backend for reading and writing a non-volatile storage for storing error data. As an example, the operating system may be a Linux operating system configured to use ERST. In one or more embodiments, upon a reboot of computing node 100, the operating system of computing node 100 may query retired page table 108 and retire page frames specified by or determined from the error information.

In operation, a processor of computing node 100, whether node controller 120, the designated SoC 104, i.e., SoC 104-1, or a combination of both node controller 120 and SoC 104-1, is/are capable of performing operations to persist error data over a reboot of computing node 100. In operation, retired page table 108 is stored within ROM 106 of computing node 100. The processor is capable of detecting one or more SoCs 104 within computing node 100. The processor is also capable of reading retired page table 108 from ROM 106. The processor is capable of comparing records of retired page table 108 with the one or more SoCs 104 within computing node 100. For each record of retired page table 108 that matches the one or more SoCs 104 within computing node 100, the processor is capable of retiring one or more physical pages of volatile memory of the one or more SoCs 104 based on each record.

Figure 2:
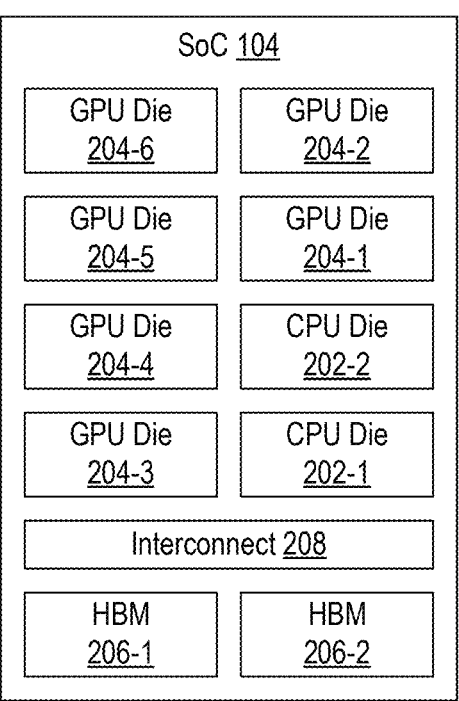
FIG. 2 illustrates an example architecture for an SoC of the computing node of FIG. 1.

FIG. 2 illustrates an example architecture for an SoC 104 of FIG. 1. In the example of FIG. 2, each SoC 104 may be formed of a plurality of different systems embodied as chiplets and/or dies. Within this disclosure, the terms "chiplet" and "die" are used interchangeably. In one or more embodiments, each SoC 104 may include a combination of one or more Central Processing Unit (CPU) dies 202 (illustrated as CPU dies 202-1 and 202-2), one or more Graphics Processing Unit (GPU) dies 204 (illustrated as GPU dies 204-1, 204-2, 204-3, 204-4, 204-5, and 204-6), and one or more volatile memories denoted as High-Bandwidth Memories (HBMs) 206 (e.g., HBM 206-1 and HBM 206-2).

For purposes of illustration and not limitation, each CPU die 202 may be implemented as any of a variety of processor types. For example, CPU dies 202 may be implemented using a complex instruction set computer architecture (CISC), a reduced instruction set computer architecture (RISC), a vector processing architecture, or other known architectures. Example CPU dies include, but are not limited to, those having an x86 type of architecture (IA-32, IA-64, etc.), Power Architecture, ARM processors, and the like. Each CPU die 202 may include one or more inter-connected cores. Each GPU die 204 may be implemented as an accelerator die. In one example implementation, each GPU die 204 may be implemented as an accelerator complex die (XCD). Each GPU die 204 may include a plurality of inter-connected compute units (e.g., circuits).

In one or more embodiments, each HBM 206 may be implemented in accordance with any of the existing HBM standards (e.g., version 1, 2, and/or 3) or in accordance with an HBM standard yet to be developed. Each HBM 206 may be implemented as a stack of synchronous dynamic random-access memory dice connected via through-silicon vias. An HBM, unlike other types of memory devices such as Non-Volatile Memory Express (NVMe) or Solid-State Drive (SSD) devices, does not have a built-in controller that is configured to retire portions of physical memory of the HBM that go bad or degrade over time. Similarly, the HBM does not have a mechanism of persisting such data. These functions are left to the operating system of computing node 100. The operating system of computing node 100 is capable of performing memory management and allocating physical pages of HBM 206 to processing tasks.

CPU die(s) 202, GPU die(s) 204, and HBMs 206 may be coupled by an interconnect 208. In one or more embodiments, interconnect 208 is implemented as, or includes, a network-on-chip.

It should be appreciated that while the inventive arrangements are described as using HBM type volatile memory, the inventive arrangements are not intended to be limited to use with only HBM. The inventive arrangements may be used to persist error data and/or retire physical pages of any of a variety of known or to be developed volatile memory including such memory devices that lack a controller as described. The term "physical page," as defined within this disclosure, means a portion or region of a volatile memory device.

In one or more embodiments, each SoC 104 may be viewed as a self-contained computer system or server. For example, each SoC 104, being a self-contained computer system or server, may be embodied as a single package that may be inserted or coupled to a socket 102. One or more or each SoC 104, for example, may store an operating system. As such, certain components such as Dual In-Line Memory Modules (DIMMs) are eliminated. Other connections typically implemented off-chip such as CPU-to-GPU communication links are implemented within each respective SoC 104. In an illustrative and non-limiting example, SoC 104 may be implemented as a MI300A APU available from Advanced Micro Devices, Inc. of Santa Clara, California.

FIG. 2 is provided for purposes of illustration and not limitation. FIG. 2 is not intended to suggest a particular type of packaging of the various dies illustrated or a particular configuration of computing node 100. One or more of the dies may be implemented in a stacked die configuration with one or more stacks of dies being disposed on an interposer or implemented using other available packaging technologies. In general, however, each SoC 104 represents a single package, e.g., an FRU, that includes interconnected CPU and GPU functionality with shared volatile memory in the form of HBM.

In the example of FIG. 2, SoCs 104 and sockets 102 lack persistent or non-volatile memory in which to store hardware errors pertaining to the HBM. Further, while certain operating systems such as Linux support retiring physical pages, the operating system does not persist the marked physical pages across boot cycles (e.g., reboots). The inventive arrangements utilize ROM 106 and the retired page table 108 stored therein as a mechanism for persisting hardware errors and, more particularly, memory errors, across boot cycles. Further, the publication of the error data allows such data to travel, or be correlated with, particular FRUs as those FRUs are moved within computing node 100 and/or among other computing nodes within the computing environment.

FIG. 3 illustrates a method 300 of booting computing node 100 in accordance with one or more embodiments of the disclosed technology. FIG. 3 illustrates an example in which certain operations pertaining to persisting error data are performed by node controller 120. Method 300 may begin in a state where node controller 120 is powered on and is tasked with booting computing node 100. In the example of FIG. 3, the various operations described occur prior to SoC 104-1 booting the operating system of computing node 100. In one or more embodiments, node controller 120 may include or have access to a program memory that stores the program code that is independent of firmware 110 and executed to perform the functions described herein in connection with FIG. 3.

In block 302, node controller 120 reads the retired page table 108 from ROM 106. In one or more embodiments, retired page table 108 is stored in a discoverable region of ROM 106. For example, an entry may be created or added to a BIOS directory table of firmware 110 that specifies the address of retired page table 108. Node controller 120 is capable of accessing the BIOS directory table during the boot process to obtain the address of retired page table 108 and read retired page table 108. In one or more alternative embodiments, where firmware 110 is implemented using UEFI, node controller 120 may access a volume used to fix retired page table 108 to a particular or predetermined location therein that is accessible by node controller 120.

In one or more embodiments, node controller 120, in reading retired page table 108 from ROM 106, maintains or stores a local copy of retired page table 108 therein. Accordingly, in embodiments where node controller 120 maintains a local copy of retired page table 108, node controller 120 performs the various operations described in connection with FIG. 3 on or with respect to the local copy of retired page table 108. Thus, while operations such as deleting a record, changing a record, creating a new record, performing comparisons, etc., are described in connection with retired page table 108, such operations may be performed on the local copy of retired page table 108. Subsequently, node controller 120 is capable of writing the local copy of retired page table 108, as modified, back to ROM 106.

In block 304, node controller 120 optionally deletes any records of the local copy of retired page table 108 that are determined to be corrupt. In one aspect, node controller 120 is capable of performing a check on each record of retired page table 108 that is read. For example, node controller 120 may perform a cyclic redundancy check (CRC) on each record of retired page table 108 that is read. In response to determining, based on the CRC of a record, that the record is corrupt, node controller 120 may delete the record from the local copy of retired page table 108.

In block 306, node controller 120 is capable of determining an identifier for each SoC 104 within computing node 100. In one or more embodiments, the identifier of each SoC 104 may be a Protected Processor Inventory Number (PPIN). The identifier may be a number assigned to each SoC 104 at manufacturing time to uniquely identify that SoC. In one aspect, node controller 120 is capable of reading the identifier for each SoC 104 included or existing in computing node 100. In another aspect, node controller 120 is capable of querying each SoC 104 for its identifier, which may be returned to node controller 120 from the respective SoC 104 in response to the querying.

In block 308, node controller 120 is capable of comparing records of retired page table 108 with the SoCs 104 within computing node 100 (e.g., as determined in block 306). For example, retired page table 108 is capable of storing a record for each of SoCs 104 in computing node 100. Each record in retired page table 108 will specify the identifier (e.g., the PPIN) of the particular SoC 104 to which that record belongs. Within this disclosure, the "corresponding" SoC of a record, or vice versa, means the SoC having a same identifier as the record (e.g., matching identifiers). In block 308, node controller 120 is capable of comparing the identifiers specified by the records of retired page table 108 with the identifiers of the SoCs 104 as determined in block 306 to determine matches.

In general, as each SoC 104 is considered an FRU, from time-to-time, different ones of SoCs 104 may be moved from one socket 102 of computing node 100 to another or from a socket 102 of computing node 100 to a socket of a different computing node within the computing environment. The ability to move SoCs 104 as described also means that retired page table 108 may include one or more records for SoCs that are no longer within computing node 100. It also may be the case that retired page table 108 does not include a record for each SoC 104 within computing node 100. For example, an SoC 104 may have been added or replaced since the last boot of computing node 100.

As discussed, each record of retired page table 108 may correspond to a section or region N of retired page table 108 on a one-to-one basis. Further, each record may be specified using CPER. Each record may include one or more entries, where each entry may specify the occurrence of a hardware error relating to the corresponding SoC 104. For purposes of illustration and not limitation, N is considered to be equal to 4 within the examples that follow. Thus, retired page table 108 may include 4 sections with each section being reserved or devoted to a particular FRU.

In one or more embodiments, each entry of a record is capable of specifying a Dynamic Random Access Memory (DRAM) address where a hardware failure (e.g., a memory failure) occurred or was detected. In one or more embodiments, examples of memory errors include ECC errors that become MCEs (e.g., Corrected Errors "CEs" and/or Uncorrected Errors "UCs"). A DRAM address is not the same as or analogous to a System Physical Address (SPA). A DRAM address specifies information about the physical memory. In one or more embodiments, each DRAM address specifies information sufficient to map the DRAM address to a specific failing physical row of a particular HBM 206 of an SoC 104. For purposes of illustration and not limitation, a DRAM address may be specified as a channel, row, bank, and column location in the relevant HBM 206.

In block 310, node controller 120 is capable of determining whether each SoC, as detected in block 306, corresponds to a record of retired page table 108. In response to determining that each SoC 104 does correspond to a record of retired page table 108, method 300 continues to block 312. In block 312, node controller 120 proceeds with the boot process for computing node 100 to boot the operating system for computing node 100. In this case, because retired page table 108 was not modified, the boot process for computing node 100 may continue without having to perform any updates to retired page table 108 within ROM 106 and without having to push an updated version of retired page table 108 to other nodes such as data processing system 150. In response to determining that at least one SoC 104 does not correspond to a record of retired page table 108, method 300 proceeds to block 314.

Proceeding with block 314, at least one mismatch exists between the SoCs 104 and the records of retired page table 108. In block 314, node controller 120 determines whether data processing system 150 (e.g., or data storage device 152) has a record for each or any SoC 104 within computing node 100 that does not have a corresponding record in retired page table 108. For example, node controller 120 is capable of querying data processing system 150 for a record by providing the identifier of each SoC 104 within computing node 100 for which no corresponding record exists in retired page table 108. In this example, the identifiers may be used as a mechanism for transferring error data to different sockets and/or computing nodes to follow the FRUs as moved within the computing environment.

In response to determining that a record does exist for such SoC(s) 104, in block 316, node controller 120 obtains, e.g., receives, the record(s) from data processing system 150. As part of block 316, node controller 120 is capable of updating the local copy of retired page table 108 with the received record or records. In response to determining that data processing system 150 does not have a record for at least one SoC 104 within computing node 100, method 300 continues to block 318.

In one or more embodiments, data processing system 150 is capable of implementing an export mechanism to export error data, e.g., records for particular identifiers (PPINs). The export mechanism allows data processing system 150 to export the error data in a form that can be imported to another system. In one or more embodiments, the format is human readable. In one or more other embodiments, the format may be binary with an option to print the error data in a human readable form or other form at the receiver. Similarly, data processing system 150 may implement an import mechanism to allow data processing system 150 to import error data that may be received from computing node 100, whether from SoC 104-1 or from node controller 120.

In block 318, node controller 120 is capable of generating a new and empty record in the local copy of retired page table 108 for each SoC 104 within computing node 100 for which retired page table 108 does not have a corresponding record and for which data processing system 150 did not return a record. The new and empty record contains no entries therein. In one or more examples, in response to generating a new and empty record, node controller 120 also may output a message indicating the creation of the new and empty record.

In block 320, node controller 120 is capable of powering off computing node 100. In one or more embodiments, computing node 100 is configured such that only one entity is permitted to access ROM 106 at a time. In this example, node controller 120 has made any updates in terms of creating new records and/or deleting records to the local copy of retired page table 108. By powering off computing node 100, e.g., SoCs 104, node controller 120 obtains control over ROM 106. Accordingly, in block 322, while computing node 100 is powered off, node controller 120 updates retired page table 108 within ROM 106. That is, node controller 120 writes the local copy of retired page table 108, as updated, back to ROM 106. This operation overwrites the previous version of 108 within ROM 106.

In block 324, in one or more embodiments, node controller 120 is capable of maintaining the local copy of retired page table 108 therein.

In block 326, node controller 120 is capable of providing error data to data processing system 150 (e.g., an administrative node). In one or more embodiments, node controller 120 is capable of sending, e.g., pushing, a copy of retired page table 108 to data processing system 150. For example, node controller 120 is capable of updating a database of error data maintained in or by data processing system 150.

In other embodiments, data processing system 150 is capable of querying node controller 120 periodically or from time-to-time to pull the error data from node controller 120. By storing the error data from computing node 100 and other computing nodes in the data processing system 150, computing nodes 100 and/or SoCs 104 may be moved throughout a computing environment such as a data center. Using processes such as those described in connection with block 312 and 314 allows the error data to move with SoCs 104 and/or computing nodes 100 when such components and/or systems are moved even to other sites (e.g., other data centers).

This functionality also facilitates the pre-population of error data for a given SoC and/or computing node 100 (e.g., a blade) in the event those components are moved from one location or system (e.g., data center) to another. Data from data processing system 150, for example, may be sent to the administrative console or node of the different locations. In this regard, the error data for the moved system may be prepopulated in the administrative node of the new location.

In block 328, node controller 120 is capable of powering on computing node 100 so that computing node 100 may continue the boot process with SoC 104-1 booting the operating system.

In the example of FIG. 3, it should be appreciated that operations such as creating a new and empty record or obtaining a record from 150 have the effect of overwriting any records in the local copy of retired page table 108 that do not correspond to an SoC 104 within computing node 100. In addition or in the alternative, node controller 120 is capable of deleting any unused records (e.g., records that do not correspond to any SoC within the computing node).

In one or more other example implementations and/or scenarios, while node controller 120 may maintain a local copy of retired page table 108, updates to retired page table 108 as stored in ROM 106 may be performed on an ongoing basis. That is, in response to a record being added, deleted, or modified, for example, node controller 120 may perform the operation on the local copy of retired page table 108 and also make the corresponding change to retired page table 108 as stored in ROM 106 rather than wait to write the entire retired page table 108 as updated as described in block 322.

Figure 4:
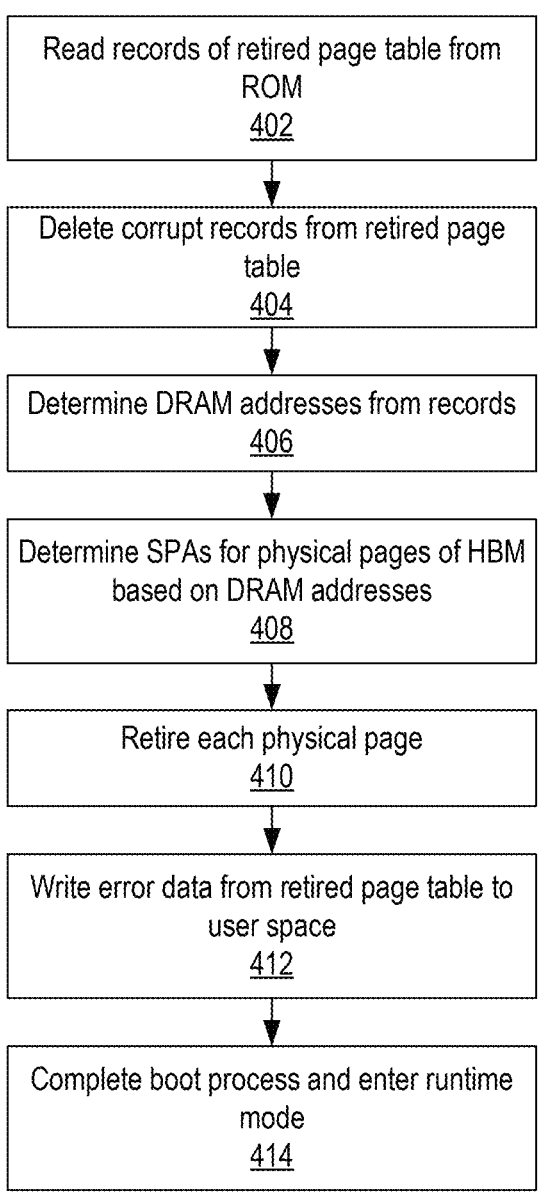
FIG. 4 illustrates another method of booting a computing node in accordance with one or more embodiments of the disclosed technology.

FIG. 4 illustrates another method 400 of booting computing node 100 in accordance with one or more embodiments of the disclosed technology. In the example of FIG. 4, the operations illustrated are performed by SoC 104-1 which is the SoC 104 of computing node 100 that is designated for booting the operating system. Method 400 may begin in a state where the operations described herein in connection with FIG. 3 as performed by node controller 120 have occurred and SoC 104-1 continues the boot process to boot the operating system. In doing so, SoC 104-1 also obtains control over ROM 106. Accordingly, SoC 104-1 is able to execute firmware 110 to perform the operations described below.

In block 402, SoC 104-1 reads retired page table 108 from ROM 106. SoC 104-1 may read retired page table 108 using any of the previously discussed mechanisms. In one or more examples, SoC 104-1 reads retired page table 108 through execution of one or more functions of firmware 110. In block 404, SoC 104-1 optionally deletes any records of retired page table 108 that are determined to be corrupt. SoC 104-1, for example, may perform a check, e.g., a CRC, on each record of retired page table 108 to detect any corrupt records of retired page table 108. In response to determining, based on the CRC of a record, that the record is corrupt, SoC 104-1 may delete the record from retired page table 108.

In block 406, SoC 104-1 is capable of determining the DRAM addresses of hardware errors specified in the records of retired page table 108. In block 408, SoC 104-1 is capable of determining physical pages of the HBM that correspond to the DRAM addresses specified in the records of retired page table 108. Each DRAM address specifies a particular portion of physical memory within an HBM of an SoC 104 within computing node 100. As discussed, each DRAM address specifies a failing physical row of a particular HBM 206 of an SoC 104. For each DRAM address specified in a record of retired page table 108 that specifies a memory error, the boot processor is capable of generating the System Physical Address (SPA) of each physical page of the HBM 206 that exists on, or occupies, the row of physical memory specified by the DRAM address.

In block 410, the boot processor is capable of invoking one or more operating system functions to retire each physical page identified by an SPA generated in block 406. For example, for each DRAM address specifying a memory error, the boot processor retires each physical page in the row, e.g., mapped to the row, indicated by the DRAM address.

In block 412, SoC 104-1 is capable of writing the error data from the retired page table 108 to the user space. That is, the error data may be written to the user space so as to be accessible by applications executing in computing node 100. In some aspects, block 412 may be optional. In one or more embodiments, SoC 104-1, in executing the operating system, creates a SYSFS "file" for each identifier (e.g., PPIN). Within each file, SoC 104-1 writes a list specifying the DRAM address associated with the SPA of each physical page of that SoC that is retired for the DRAM address. In block 414, SoC 104-1 completes the boot process and computing node 100 enters the runtime, or "mission," mode of operation.

In one or more other embodiments, the boot processor may also print out a listing having entries specifying SPA+DRAM address+PPIN (e.g., each of SPA, DRAM address, and PPIN) to a system log that may be accessed by node controller 120 or data processing system 150.

Figure 5:
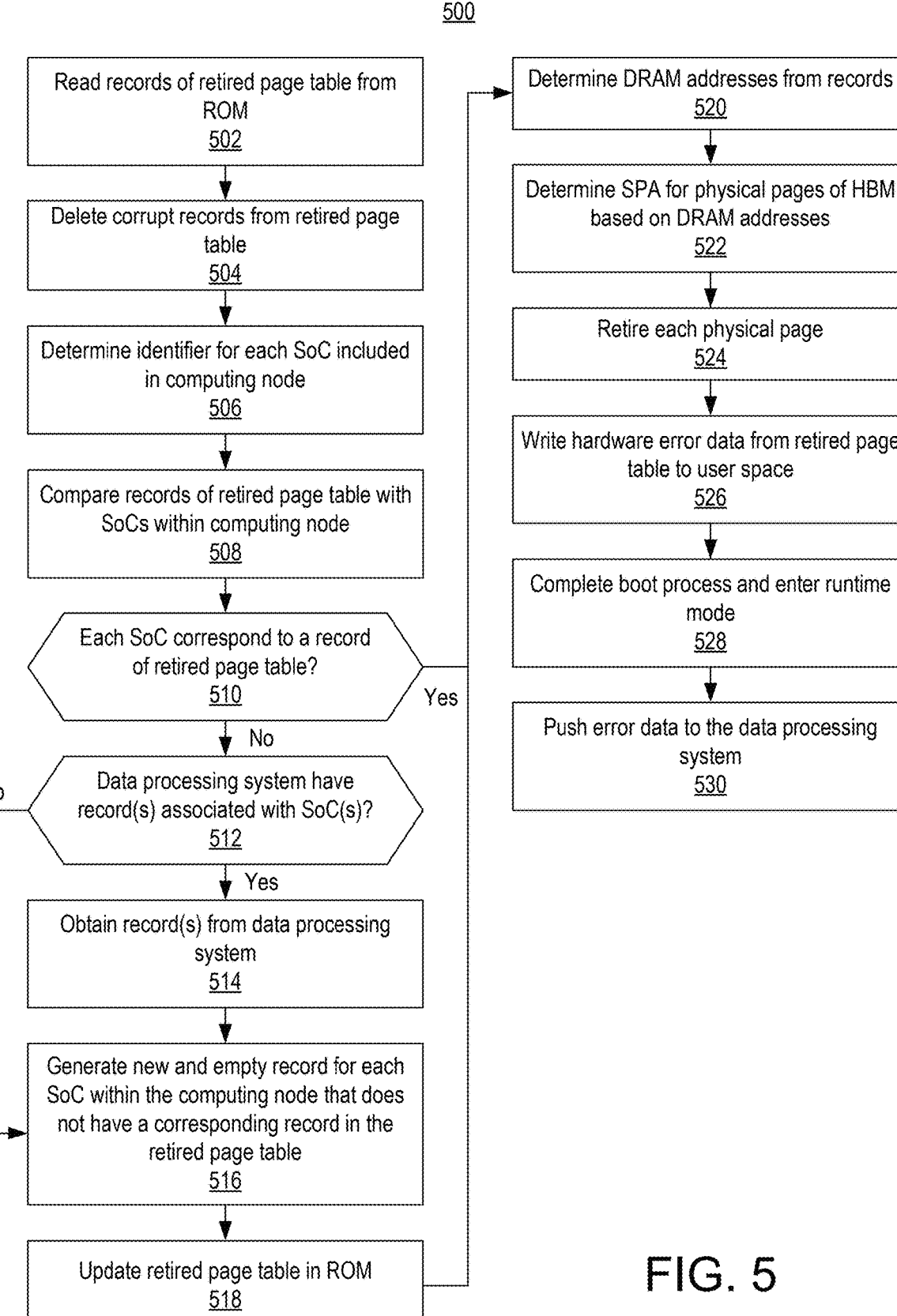
FIG. 5 illustrates another method of booting a computing node in accordance with one or more embodiments of the disclosed technology.

FIG. 5 illustrates another method 500 of booting computing node 100 in accordance with one or more other embodiments of the disclosed technology. In the example, SoC 104-1 performs the operations as part of a boot process for the operating system of computing node 100. In one or more embodiments, certain operations of FIG. 5 such as blocks 504-516 may be performed in cases where node controller 120 does not perform such operations. In one or more other embodiments, the operations of blocks 504-516 may be performed as a failsafe or check despite node controller 120 performing such operations. It should be appreciated that if node controller 120 performs such operations, SoC 104-1 will not have a need to retrieve records from data processing system 150 and/or to create new and empty records as each record in retired page table 108 should match each SoC 104 in computing node 100. Still, in one or more embodiments, SoC 104-1 may perform the operations described in connection with FIG. 5 in place of the operations described in connection with FIG. 4.

In block 502, SoC 104-1 reads retired page table 108 from ROM 106. SoC 104-1 may read retired page table 108 using any of the various mechanisms described herein. For example, SoC 104-1 may execute one or more functions of firmware 110 to access and/or update retired page table 108.

In block 504, SoC 104-1 optionally deletes any records of retired page table 108 that are determined to be corrupt. SoC 104-1, for example, may perform a check, e.g., a CRC, on each record of retired page table 108 to detect any corrupt records of retired page table 108. In response to determining, based on the CRC of a record, that the record is corrupt, SoC 104-1 may delete the record from retired page table 108.

In block 506, SoC 104-1 is capable of determining an identifier (e.g., a PPIN) for each SoC 104 within computing node 100. The identifier may be a number assigned to each SoC 104 at manufacturing time to uniquely identify that SoC. In one aspect, SoC 104-1 is capable of reading the identifier for each SoC 104 included or existing in computing node 100. In another aspect, SoC 104-1 is capable of querying each SoC 104 for its identifier, which may be returned to SoC 104-1 from the respective SoC 104 in response to the querying.

In block 508, SoC 104-1 is capable of comparing records of retired page table 108 with the SoCs 104 within computing node 100 (e.g., as determined in block 506). For example, retired page table 108 is capable of storing a record for each SoCs 104 in computing node 100. Each record in retired page table 108 will specify the identifier (e.g., the PPIN) of the particular SoC 104 to which that record belongs. In block 508, SoC 104-1 is capable of comparing the identifiers specified by the records of retired page table 108 with the identifiers of the SoCs 104 as determined in block 506 to determine matches.

In block 510, SoC 104-1 is capable of determining whether each SoC, as detected in block 506, corresponds to a record of retired page table 108. In response to determining that each SoC 104 does correspond to a record of retired page table 108, method 500 continues to block 520 where SoC 104-1 proceeds with the boot process for computing node 100 to boot the operating system for computing node 100. In this case, because retired page table 108 was not modified, the boot process for computing node 100 may continue without having to perform any updates to retired page table 108 within ROM 106. In response to determining that at least one SoC 104 does not correspond to a record of retired page table 108, method 500 proceeds to block 512.

Proceeding with block 512, at least one mismatch exists between the SoCs 104 and the records of retired page table 108. In block 512, SoC 104-1 optionally determines whether data processing system 150 (e.g., or data storage device 152) has a record for each or any SoC 104 within computing node 100 that does not have a corresponding record in retired page table 108. For example, SoC 104-1 is capable of querying data processing system 150 for a record by providing the identifier of each SoC 104 within computing node 100 for which no corresponding record exists in retired page table 108.

In response to determining that data processing system 150 does have a record for such SoC(s) 104, e.g., SoC 104-1 receives a record or records from data processing system 150, method 500 continues to block 514. In block 514, SoC 104-1 obtains the record(s) from data processing system 150. In response to determining that data processing system 150 does not have a record for at least one SoC 104 within computing node 100, method 500 continues to block 516.

In block 516, SoC 104-1 is capable of generating a new and empty record in retired page table 108 for each SoC 104 within computing node 100 for which retired page table 108 does not have a corresponding record and for which data processing system 150 did not return a record. A new and empty record contains no entries therein. In one or more examples, in response to generating a new and empty record, SoC 104-1 also may output a message indicating the creation of the new and empty record.

In block 518, SoC 104-1 updates retired page table 108 within ROM 106. As noted, computing node 100 is configured such that only one entity is permitted to access ROM 106 at a time. In one or more embodiments, SoC 104-1 writes any changes (e.g., updates) to retired page table 108 such as new and empty records and/or records obtained from data processing system 150. This operation overwrites the previous version of retired page table 108 within ROM 106 or overwrites any records of retired page table 108 that do not correspond to any SoC 104 of computing node 100. In one or more other embodiments, SoC 104-1 is capable of maintaining a local copy of retired page table 108, updating the local copy of retired page table 108 as described herein in connection with node controller 120, and writing the local copy of retired page table 108, as updated, back to ROM 106.

In still one or more other embodiments, SoC 104-1 is capable of updating retired page table 108 on a per record basis as new records are generated or obtained. For example, as a record is obtained from data processing system 150 or newly created (e.g., an empty record), SoC 104-1 may write that record to retired page table 108 overwriting a record therein that does not match any SoC 104 in computing node 100.

In block 520, SoC 104-1 is capable of determining the DRAM addresses of memory errors specified in the records of retired page table 108. In block 522, the boot processor is capable of determining physical pages of the HBM that correspond to the DRAM addresses specified in the records of retired page table 108. Each DRAM address specifies a particular portion of physical memory within an HBM of an SoC 104 within computing node 100. As discussed, each DRAM address specifies a failing physical row of a particular HBM 206 of an SoC 104. For each DRAM address specified in a record of retired page table 108 that specifies a hardware error, the boot processor is capable of generating the SPA of each physical page of the HBM 206 that exists on, or occupies, the row of physical memory.

In block 524, SoC 104-1 is capable of invoking one or more operating system functions to retire each physical page identified by an SPA generated in block 522. For example, for each DRAM address specifying a memory error, SoC 104-1 retires each physical page in the row, e.g., mapped to the row, indicated by the DRAM address.

In block 526, SoC 104-1 is capable of writing the error data from retired page table 108 to the user space. That is, the error data may be written to the user space so as to be accessible by applications executing in computing node 100. In some aspects, block 526 is optional. In one or more embodiments, SoC 104-1, in executing the operating system, creates a SYSFS "file" for each identifier (e.g., PPIN). Within each file, SoC 104-1 writes a list specifying the DRAM address associated with the SPA of each physical page of that SoC that is retired for the DRAM address. In block 528, SoC 104-1 completes the boot process and computing node 100 enters the runtime, or "mission," mode of operation.

In one or more other embodiments, the boot processor may also print out a listing having entries specifying DPA+ DRAM address+PPIN (e.g., each of the DPA, DRAM address, and PPIN) to a system log that may be accessed by node controller 120 or data processing system 150.

In block 530, SoC 104-1 is capable of providing the error data from retired page table 108 to data processing system 150. For example, SoC 104-1 is capable of pushing error data obtained from retired page table 108, as updated, or the local copy of retired page table 108 as updated to data processing system 150.

FIG. 6 illustrates a method 600 of logging and persisting memory errors detected during runtime of computing node 100 in accordance with one or more embodiments of the disclosed technology. Method 600 may begin in a state where the operating system has been booted and is operating in mission mode. In operation, computing node 100, and more particularly SoC 104-1, is capable of monitoring for the occurrence of memory errors during operation.

In block 602, a memory error is detected within computing node 100. The memory error is a hardware error detected in a volatile memory of an SoC 104 within computing node 100. For example, the SoC 104-1 may detect an MCE error pertaining to a region of physical memory such as an HBM of an SoC 104. The memory error may specify the DRAM address at which the memory error was detected. The memory error may be provided from the hardware of computing node 100 to the operating system by way of an error handler.

In block 604, SoC 104-1 is capable of mapping the memory error to a particular one of the SoCs 104 within computing node 100. In one or more embodiments, SoC 104-1 is capable of mapping the memory error to a particular SoC based on the DRAM address. In performing the mapping, SoC 104-1 is aware of the particular identifier for the SoC that experienced the memory error. For purposes of discussion, the SoC that experienced the memory error is referred to in the description of FIG. 6 as the "selected SoC 104."

In block 606, SoC 104-1 is capable of reading the record of retired page table 108 that matches the identifier of the selected SoC 104. In block 608, SoC 104-1 compares the number of memory errors, e.g., a count, as specified in the matching record of retired page table 108 with a threshold number of memory errors.

For example, each record is capable of storing a plurality of entries. Each memory error may be stored as an entry on a one-to-one basis. As such, the number of entries in a record for a given SoC 104 will match, e.g., be equal to, the number of memory errors that have been detected for that SoC. The total number of entries that may be stored in a record, referred to herein as the "physical entry limit," is restricted by the physical size of retired page table 108, the number of records N contained therein, and the size of the entries. For purposes of illustration, each record may store a maximum of 1022 entries.

The threshold is a number of entries that is less than the physical entry limit. Taking the previous example of a physical entry limit of 1022 entries for a record, the threshold number of entries is set to an integer value less than 1022. In one or more embodiments, the threshold is user configurable. For example, the threshold may be implemented as a kernel command-line parameter that is modifiable at compile time and at boot time of computing node 100. In one or more aspects, the threshold is used to specify a maximum number of tolerable memory errors on a per SoC 104 basis. A number of memory errors that meets or exceeds the threshold may be used as an indication that the SoC should be replaced.

Continuing with block 608, SoC 104-1 is capable of reading the record corresponding to the selected SoC, determining the number of entries in that record, and comparing the number of entries with the threshold number of entries.

In block 610, in response to SoC 104-1 determining that the number of memory errors (e.g., entries) is less than the threshold, method 600 continues to block 612. In block 612, SoC 104-1 generates an entry in the record of retired page table 108 corresponding to the selected SoC. SoC 104-1, for example, creates an entry in the record for the selected SoC 104 that specifies the DRAM address at which the memory error was detected. In block 612, because the number of entries in the record is less than the threshold, there is sufficient space available in ROM 106 to store the memory error. After block 612, method 600 continues to block 616. SoC 104-1 is capable of invoking one or more functions of firmware 110 to update the appropriate record of retired page table 108 (e.g., by adding an entry thereto).

In response to SoC 104-1 determining that the number of errors is greater than or equal to the threshold, method 600 continues to block 614. In block 614, SoC 104-1 generates a warning message. In one or more embodiments, the warning message may be printed or otherwise output to a system log file. In block 614, because the number of entries in the record is greater than or equal to the threshold, though still below the physical entry limit, SoC 104-1 does not create a new entry in the record of retired page table 108 for the memory error. After block 614, method 600 continues to block 616.

In block 616, SoC 104-1 begins the process of retiring those physical pages associated with the DRAM address as previously described in connection with blocks 522-526 of FIG. 5. Thus, regardless of whether the memory error was recorded in the record in retired page table 108, the physical pages associated with the DRAM address at which the memory error was detected still are retired.

For example, in block 616, SoC 104-1 is capable of determining physical pages of the HBM that correspond to the DRAM address of the memory error detected in block 602. Each DRAM address specifies a particular portion of physical memory within an HBM of an SoC 104 within computing node 100. As discussed, each DRAM address specifies a failing physical row of a particular HBM 206 of the selected SoC 104. For each DRAM address specified in a record of retired page table 108 that specifies a hardware error, SoC 104-1 is capable of generating the SPA of each physical page of the HBM 206 that exists on, or occupies, the row of physical memory.

In block 618, SoC 104-1 is capable of invoking one or more operating system functions to retire each physical page identified by an SPA generated in block 616. For example, for each DRAM address specifying a memory error, SoC 104-1 retires each physical page in the row, e.g., mapped to the row, indicated by the DRAM address.

In block 620, SoC 104-1 is capable of writing the error data to the user space. That is, the error data, as generated, also may be written to the user space of the operating system so as to be accessible by applications executing in computing node 100. In one or more aspects, block 620 is optional. In block 620, for example, SoC 104-1 is capable of adding or appending the error data for the detected memory error to the particular file (e.g., SYSFS file) corresponding to the selected SoC 104. In one or more embodiments, SoC 104-1, in executing the operating system, adds or appends the SPA+DRAM address+PPIN (e.g., each of the SPA, DRAM address, and PPIN) to the particular SYSFS file for the selected SoC 104.

In the example of FIG. 6, the use of the threshold by the primary SoC 104 may be further described as follows. In response to detecting a memory error for a selected SoC of the one or more SoCs 104-1 within computing node 100, SoC 104-1 is capable of comparing the number of entries in the record of retired page table 108 for the selected SoC with the threshold number of entries. In response to the number of the entries being less than the threshold number of entries, SoC 104-1 is capable of retiring one or more additional physical pages of a volatile memory of the selected SoC that correspond to the memory error and is capable of generating an entry for the memory error in the record of retired page table 108 for the selected SoC.

In one or more embodiments, in response to detecting a memory error for the selected SoC within computing node 100, SoC 104-1 is capable of comparing the number of entries in the record of retired page table 108 for the selected SoC with the threshold number of entries. As noted, the threshold number of entries is less than the physical entry limit. In response to the number of the entries exceeding the threshold number of entries and being less than the physical entry limit, SoC 104-1 is capable of retiring one or more additional physical pages of a volatile memory of the selected SoC that correspond to the memory error without generating a further entry for the memory error in the record of the retired page table for the selected SoC.

In block 622, SoC 104-1 is capable of sending updated error data to data processing system 150. In one or more alternative embodiments, node controller 120 is capable of reading the error data from a source such as the system logs and/or the SYSFS file(s) and pushing the error data to data processing system 150. For example, in some embodiments, SoC 104-1 or node controller 120 is capable of pushing error data to data processing system 150 in response to the retirement of one or more pages or in response to retiring a threshold number of pages. In still one or more other embodiments, data processing system 150 is capable of requesting the error data from SoC 104-1 or requesting the error data from node controller 120 from time-to-time or periodically.

Figure 7:
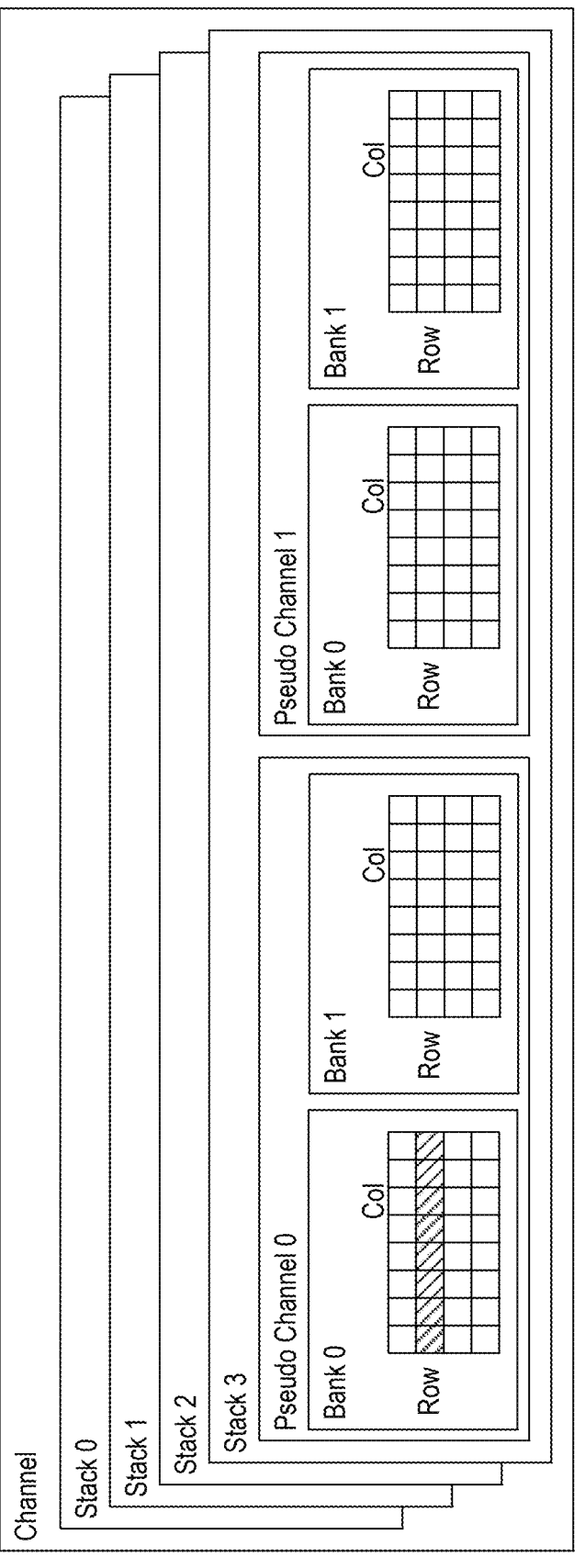
FIG. 7 illustrates retirement of physical pages of an example implementation of High-Bandwidth Memory included in the computing node of FIG. 1.

FIG. 7 illustrates retirement of physical pages of an example implementation of HBM 206. In the example, HBM 206 corresponds to a channel of HBM having a plurality of slices. Each slice may include a plurality of pseudo channels. Each pseudo channel may include a plurality of banks. In one or more embodiments, the DRAM address specifies a particular row of HBM (in a given HBM 206) in a particular bank. In the example of FIG. 7, each bank is shown to include (only for purposes of illustration) 32 physical pages corresponding to the rectangles (e.g., arranged in rows and columns as a grid). Accordingly, when a row of a bank is detected as having a memory error, each page in the row is retired.

For purposes of illustration, consider an example where a memory error is detected within the shaded row of bank 0 of pseudo channel 0. In that case, each page (shown with shading) is retired in the operating system.

Figure 8:
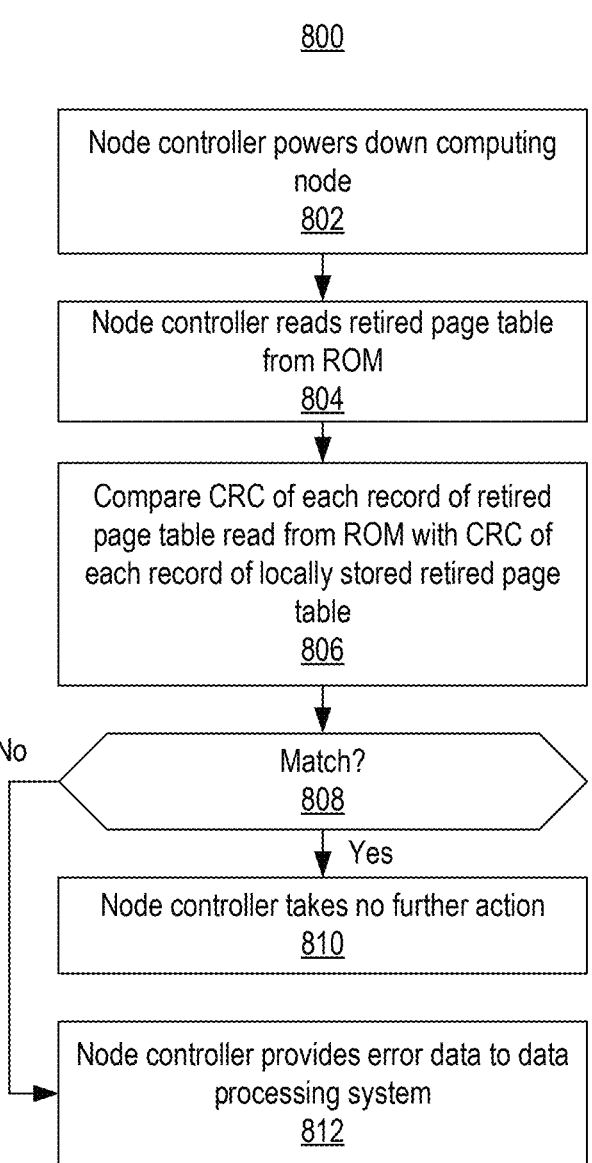
FIG. 8 illustrates a method of operation of a node controller of a computing node in accordance with one or more embodiments of the disclosed technology.

FIG. 8 illustrates a method 800 of operation of node controller 120 in accordance with one or more embodiments of the disclosed technology. Method 800 illustrates certain operative features of node controller 120 that may be performed as part of a shutdown process to update the error data as may be maintained by data processing system 150.

In block 802, in response to initiating a command to power off computing node 100 or detecting a condition that triggers a powering off of computing node 100, node controller 120 powers down computing node 100. For example, each of the SoC 104 is powered off through a shutdown process. In block 804, node controller 120 reads retired page table 108 from ROM 106. Since SoCs 104 are powered down, node controller 120 obtains control over ROM 106 and is able to read retired page table 108.

In block 806, node controller 120 compares the CRC of each record of retired page table 108 as read from ROM 106 with the CRC of each respective or corresponding record from the locally stored version of retired page table 108 stored by node controller 120. In block 808, node controller 120 determines whether the CRCs match. In response to determining that each CRC of retired page table 108 as read from ROM 106 matches the CRC of the corresponding record of the locally stored retired page table 108, method 800 proceeds to block 810 where node controller 120 takes no further action. In response to determining that at least one CRC of retired page table 108 as read from 106 does not match the CRC of the corresponding record of the locally stored retired page table 108, method 800 continues to block 812 where node controller 120 is capable of providing the updated error data (e.g., the error data as read from ROM 106 and not the locally stored error data) to data processing system 150. In this example, node controller 120 presumes that retired page table 108 as read from ROM 106 is the correct data to be provided to the administrative node or data processing system 150.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, "data processing system" means one or more hardware systems configured to process data, each hardware system including at least one hardware processor programmed to initiate operations and memory.

As defined herein, "execute" and "run" comprise a series of actions or events performed by the hardware processor in accordance with one or more machine-readable instructions. "Running" and "executing," as defined herein refer to the active performing of actions or events by the hardware processor. The terms run, running, execute, and executing are used synonymously herein.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
detecting, by a hardware processor of a computing node, one or more System-on-Chips (SoCs) within the computing node;
reading, by the hardware processor, a retired page table from a read only memory of the computing node;
comparing, by the hardware processor, records of the retired page table with the one or more SoCs within the computing node; and
for each record of the retired page table that matches the one or more SoCs within the computing node, retiring one or more physical pages of a volatile memory of the one or more SoCs based on each record.

2. The method of claim 1, further comprising:
publishing one or more records of the retired page table of the read only memory to a user space of an operating system of the computing node.

3. The method of claim 1, further comprising:
in response to detecting a selected SoC of the one or more SoCs within the computing node that does not match any record of the retired page table, creating a new and empty record for the selected SoC.

4. The method of claim 1, further comprising:
in response to detecting a selected SoC of the one or more SoCs within the computing node that does not match any record of the retired page table, querying a data processing system for a record corresponding to the selected SoC.

5. The method of claim 1, further comprising:
maintaining, by the hardware processor, a local copy of the retired page table;
generating an updated retired page table by modifying at least one entry of the local copy of the retired page table; and writing the updated retired page table to the read only memory of the computing node.

6. The method of claim 1, wherein the hardware processor is a node controller of the computing node.

7. The method of claim 1, wherein the one or more SoCs include a plurality of SoCs and the hardware processor is an SoC of the plurality of SoCs.

8. The method of claim 1, wherein the hardware processor is configured to provide error data from the retired page table to a data processing system.

9. The method of claim 1, further comprising, during runtime:

in response to detecting a memory error for a selected SoC of the one or more SoCs within the computing node, comparing a number of entries in a record of the retired page table for the selected SoC with a threshold number of entries that is less than a physical entry limit; and in response to the number of the entries exceeding the threshold number of entries and being less than the physical entry limit, retiring one or more additional physical pages of a volatile memory of the selected SoC that correspond to the memory error without generating a further entry for the memory error in the record of the retired page table for the selected SoC.

10. The method of claim 1, further comprising, during runtime:

in response to detecting a memory error for a selected SoC of the one or more SoCs within the computing node, comparing a number of entries in a record of the retired page table for the selected SoC with a threshold number of entries; and in response to the number of the entries being less than the threshold number of entries, retiring one or more additional physical pages of a volatile memory of the selected SoC that correspond to the memory error and generating an entry for the memory error in the record of the retired page table for the selected SoC.

11. A computing node, comprising:

a read only memory configured to store a retired page table;

one or more System-on-Chips (SoCs); and a hardware processor configured to execute operations including:

detecting the one or more SoCs within the computing node;

reading the retired page table from the read only memory;

comparing records of the retired page table with the one or more SoCs within the computing node; and for each record of the retired page table that matches the one or more SoCs within the computing node, retiring one or more physical pages of a volatile memory of the one or more SoCs based on each record.

12. The computing node of claim 11, wherein the hardware processor is configured to execute operations comprising:

publishing one or more records of the retired page table of the read only memory to a user space of an operating system of the computing node.

13. The computing node of claim 11, wherein the hardware processor is configured to execute operations comprising:

in response to detecting a selected SoC of the one or more SoCs within the computing node that does not match any record of the retired page table, creating a new and empty record for the selected SoC.

14. The computing node of claim 11, wherein the hardware processor is configured to execute operations comprising:

in response to detecting a selected SoC of the one or more SoCs within the computing node that does not match any record of the retired page table, querying a data processing system for a record corresponding to the selected SoC.

15. The computing node of claim 11, further comprising:

a node controller, wherein the node controller is configured to execute operations including:

maintaining a local copy of the retired page table;

generating an updated retired page table by modifying at least one entry of the local copy of the retired page table; and writing the updated retired page table to the read only memory of the computing node.

16. The computing node of claim 11, wherein the hardware processor is a node controller of the computing node.

17. The computing node of claim 11, wherein the one or more SoCs include a plurality of SoCs and the hardware processor is an SoC of the plurality of SoCs.

18. The computing node of claim 11, wherein the hardware processor is configured to execute operations comprising:

providing error data from the retired page table to a data processing system.

19. The computing node of claim 11, wherein the hardware processor is configured to execute operations during runtime comprising:

in response to detecting a memory error for a selected SoC of the one or more SoCs, comparing a number of entries in a record of the retired page table for the selected SoC with a threshold number of entries that is less than a physical entry limit; and in response to the number of the entries exceeding the threshold number of entries and being less than the physical entry limit, retiring one or more additional physical pages of a volatile memory of the selected SoC that correspond to the memory error without generating a further entry for the memory error in the record of the retired page table for the selected SoC.

20. The computing node of claim 11, wherein the hardware processor is configured to execute operations during runtime comprising:

in response to detecting a memory error for a selected SoC of the one or more SoCs, comparing a number of entries in a record of the retired page table for the selected SoC with a threshold number of entries; and in response to the number of the entries being less than the threshold number of entries, retiring one or more additional physical pages of a volatile memory of the selected SoC that correspond to the memory error and generating an entry for the memory error in the record of the retired page table for the selected SoC.

* * * * *